Feb. 9, 1937. T. D. LANE Re. 20,262
SUPPLY MECHANISM
Original Filed Nov. 7, 1931
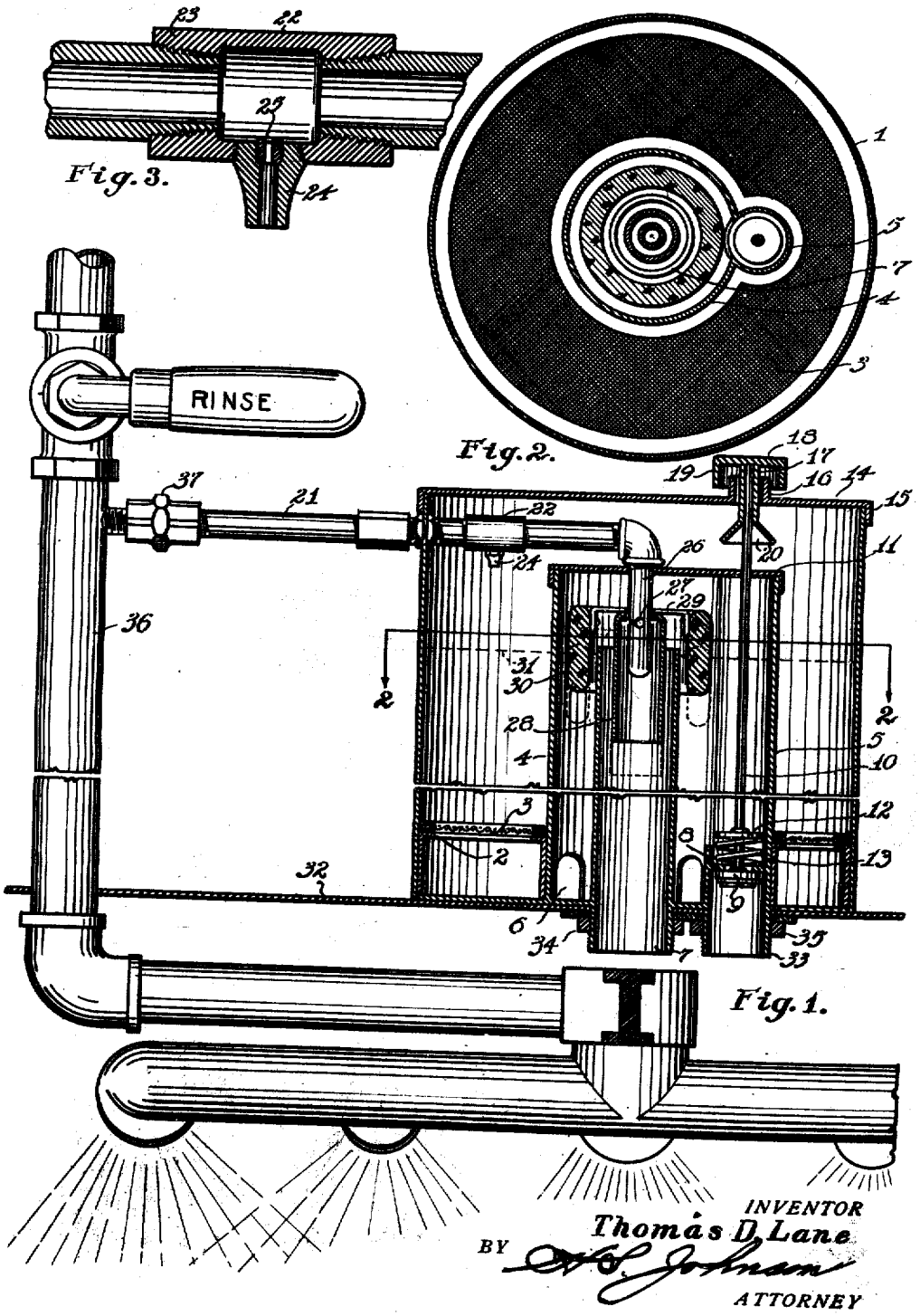
INVENTOR
Thomas D. Lane
BY
W. S. Johnson
ATTORNEY

UNITED STATES PATENT OFFICE 20,262

SUPPLY MECHANISM

Thomas D. Lane, St. Paul, Minn., assignor to Economics Laboratory, Inc., St. Paul, Minn., a corporation of Delaware Original No. 1,940,217, dated December 19, 1933, Serial No. 573,713, November 7, 1931. Application for reissue June 9, 1934, Serial No. 729,759½

10 Claims. (Cl. 141—9)

The present invention relates to a cleaning solution supply mechanism for dishwashing and industrial washing machines.

In most dishwashing machines of the type used in restaurants a reservoir is provided for containing cleaning solution, with an electrically driven pump connected from the reservoir to spray heads mounted within the dishwashing machine to spray the cleaning solution over dishes supported on a rack within the dishwashing machine, and fresh, hot water is supplied through a spray head to rinse the dishes after being cleaned. Such dishwashing machines ordinarily have the cleaning solution reservoir arranged below the spray heads so that the water from the spray heads drains off the dishes being rinsed and falls into the reservoir of cleaning solution. An overflow pipe is provided at a predetermined height in the solution reservoir so that an amount of the cleaning solution equal to the amount of spray water introduced overflows at each spraying operation. This, of course, dilutes the cleaning solution upon each spraying operation, and in order to maintain the solution at a proper strength for cleaning the dishes, it is necessary to add concentrated cleaning solution at frequent intervals.

An essential object of the present invention is to provide means whereby a predetermined quantity of cleaning material, or solution, is discharged into the dishwashing machine in fixed relation with the rinsing or spraying operation.

Means are further provided permitting the introduction of a large quantity of concentrated cleaning solution to initially charge the dishwashing machine. By having the mechanism of a character that will discharge a predetermined quantity of cleaning medium controlled by and concurrently with the operation of the discharge of the rinse water automatic operation of the cleaning solution apparatus is secured with certainty and efficiency of results.

In the adaptation of the present invention shown in the drawing, there is provided a tank adapted to contain a quantity of soluble cleaning material and a pipe connected from a rinsing spray line of a dishwashing machine to the interior of the tank. A small opening is provided to permit a predetermined quantity of water from the rinse line to enter the tank upon each rinsing operation, an overflow opening being provided interiorly of the tank to maintain the level of the liquid in said tank at a predetermined height. The overflow from said tank is conducted into the solution reservoir of a dishwashing machine with which the device is associated. A manually operable valve is provided for quickly discharging a large quantity of the contents of the tank into the solution reservoir of the dishwashing machine, and controlled inlet means are provided to rapidly fill the tank after a charging operation.

These and other features of the invention will be more fully brought out in the following description and the accompanying drawing, wherein:

Figure 1 is a vertical, sectional view through a mechanism embodying the present invention.

Figure 2 is a sectional view on the line 2—2 of Figure 1; and

Figure 3 is an enlarged, longitudinal, sectional view of a metering outlet.

Referring to the drawing in detail, a container 1, which is here shown as being cylindrical in shape, is provided with an inwardly disposed flange 2 spaced upwardly from the bottom of said container to support a screen 3 upon which a soluble cleaning substance is adapted to be supported. A cylindrical wall 4 having an offset portion 5 on one side thereof is secured to the bottom of the container 1 and is provided with notched openings 6 in the lower end thereof to permit the free passage of liquid therethrough. A tubular central overflow pipe 7 is mounted concentrically with the cylindrical wall 4 and a valve seat 8 is mounted in the offset portion 5. A valve 9, which may be of rubber or fibre, is mounted beneath the valve seat 8 and a rod 10 connected to said valve extends upwardly through a cover member 11 which is mounted to cover the upper edge of the wall 4 and offset portion 5. A collar 12 is provided on said rod and a coil compression spring 13 is mounted below said collar to rest upon the upper surface of the valve seat 8 to hold the valve normally in a closed position. The container 1 is provided with a cover 14 having a downwardly turned flange 15 around the periphery thereof to close the upper end of the container.

An upwardly extending collar 16 is provided in the cover and is adapted to be positioned directly above the center of the offset portion 5 of the annular wall 4. Slidably mounted in this flanged collar is a valve operating member 17. This member is provided with an enlarged head portion 18 with a downwardly turned peripheral flange 19 adapted to surround the collar 16. This member is provided with a funnel-shaped skirt 20 on the lower end thereof and has a central opening of a size to freely receive the upper end of the valve operating rod 10. A water supply pipe 21 is mounted in one side of the wall 1 of the container and has a metered discharge outlet 22 mounted therein. The construction of this metered outlet is clearly shown in Figure 3. It comprises a sleeve 23 in which the two sides of the pipe 21 are threadedly inserted. A small outlet nozzle 24 is threadedly inserted in the central portion of the sleeve and a small metering plug 25 is threadedly inserted in the top of the nozzle 24. By providing metering plugs with different sizes of central openings the rate of discharge of water therethrough can be determined with sufficient accuracy to meet the requirements of an installation in which the flow of rinse water, and pressure on the rinse line is known. This is not intended to be adjustable in use and when the proper size of metering plug has been inserted for a predetermined water pressure and a required flow of cleaning material, no further adjustment is required. A downwardly projecting pipe 26 is in open communication with the pipe 21 and this downwardly projecting pipe is closed at its lower end and is provided with radially disposed spray openings 27 therein so that water passing through the pipe 26 will be sprayed outwardly through these openings. A slidable sleeve 28 is mounted over the tube 27 and the upper end thereof is bent inwardly to slightly clear the pipe 27 to permit free slidable movement of the sleeve 28 with respect to the pipe 26. A yoke 29 is connected to the slidable sleeve 28 and this yoke is connected on its outer ends to an annular float 30 which may be of cork or other construction, as required.

The liquid level in the container is indicated by the dotted line 31 and it will be noted that as the liquid reaches this level the slidable sleeve 28 will be raised upwardly by the float 30 to cover the openings 27 in the downwardly extending pipe 26 so that water expelled from these openings will be carried downwardly inside the sleeve 28 and thence through the overflow tube 7. The flow of clean water through the overflow pipe prevents crystallization of the interior of this pipe by the concentrated cleaning solution. The top plate of a dishwashing machine is indicated at 32 and the extended lower end of the overflow tube 7 and also an extension 33 from below the valve 9 are inserted through openings cut in the top plate 32 of the dishwashing machine. The lower ends of the tube 7 and extension 33 are threaded and a washer of rubber or other suitable material is provided to form a water-tight seal at the point of penetration of the plate 32 by the tube 7 and the extension 33. Nuts 34 and 35 are threaded onto the lower end of the tube 7 and extension 33, respectively, to hold the container 1 rigidly in position on the dish-washing machine.

The adaptation shown in the drawing illustrates one method of installation embodying an essential characteristic of the invention, i. e., the automatic operation of the invention in fixed relation to the rinsing operation. In this adaptation installation is accomplished by drilling and tapping a hole in a water supply pipe 36 of a dishwashing machine to receive a fitting 37 into which is threadedly inserted a tube 21. The tube 21 is then brought by the most convenient route into the interior of the container 1, as illustrated in Figure 1. With a predetermined city water pressure, which may be accurately determined for any given locality of the city, a certain size of metering plug 25 may be specified by the manufacturer for a known size and model of dishwashing machine. If desired, a pressure gauge may be threadedly inserted into the hole drilled and tapped in the pipe 36 to determine the water pressure and tables may be provided for the men doing the installing so that with a specified water pressure and specified type of dishwashing machine a certain size of metering plug 25 may be specified.

Another way of determining the pressure would be to insert a specified size of metering plug 25 and then turn on the rinse and note the time required before the container 1 overflows through the tube 7. Holes of a required size are then cut in the top plate 32 of the dishwashing machine so that the tube 7 and extension 3 will be in a position to discharge the contents of the container 1 downwardly into the solution reservoir of the dishwashing machine. If desired, and space within the dishwashing machine permits, the container 1 may be mounted interiorly of the dishwashing machine. These, however, are matters for consideration for individual installations, either method of installation being satisfactory, provided it does not interfere with the normal operation of the dishwashing machine.

In operating the device the cover 14 is removed from the container 1 and a quantity of soluble cleaning material, not shown, is inserted in the container 1 around the wall 4. The cleaning material may be inserted to the height of the upper end of the member 4 and preferably should not be added to extend beyond this height. The cover 14 is then replaced, the skirt 28 acting to guide the rod 16 into the operating button 17. When the tank is empty of liquid, the float 30 and attached sleeve 28 will be in the downward or dotted line position indicated in Figure 1, so that upon each operation of the rinse sprays of the dishwashing machine, water will be discharged through the openings 27 of the pipe 26. Also, at each spraying operation, a small quantity of water will be discharged through the metering plug 25 and nozzle 24. The water passes downwardly through the notched opening 6 and upwardly into the soluble cleaning substance contained in the space between the wall of the container 1 and the wall 4. Upon rising of the liquid level in the container to the dotted line position 31, the upper edge of the sleeve 28 will be moved above the openings 27 so that the water from these openings will pass downwardly and be discharged through the overflow pipe. Therefore, as long as the liquid level remains at the height of the dotted line 31, the only water entering the container will pass through the metered orifice in the metering plug 25. This water will fill the container to the top of the overflow tube 7 and thereafter at each rinsing operation a small quantity of liquid in the container will be caused to overflow through the tube 7 and pass downwardly into the reservoir of the dishwashing machine with which the device is associated. After the reservoir of the dishwashing machine has been drained and refilled with fresh water, it is necessary to initially charge the fresh water with cleaning compound and this is accomplished by depressing the operating button 17 which opens the valve 9 and discharges the liquid in the container 1 into the reservoir of the dishwashing machine. Thereafter the container will be rapidly filled by the water passing through the openings 27 and from this point on the operation will be as above described.

As it will be apparent, by having the operation of feeding the cleaning medium to the dishwashing machine in predetermined amounts made dependent upon the operation of feeding the rinse water into the dishwashing machine, an operator is relieved from paying any attention to the means for feeding the cleaning medium to the dishwashing machine and is enabled to depend upon the certainty of automatic operation. Furthermore, the operation is made particularly efficient and economical. As shown, I preferably provide the tank with two communicating compartments, one holding the cleaning compound and the other being a discharge compartment with the metered inlet opening of the water supply discharging a predetermined quantity of water to the cleaning material compartment at each operation of the rinse. The two compartments being communicating, results in an even level of the solution produced by the inlet of water being maintained in the communicating compartments, so that as far as holding the cleaning solution is concerned, the two compartments act as a single compartment. As the level in the two compartments is raised, by the inlet of water to the compartments to a level above the overflow means, that excess of raised solution passes through the overflow means to the dishwashing machine. Thus, the amount of cleaning medium that passes to the dishwashing machine is an absolutely determined quantity. I have found it an advantage to divide the container into two compartments, for the reason that the cleaning compound itself is kept out of contact with the overflow outlet, except when it is in solution, even though those two compartments so communicate that as far as holding the solution is concerned they act as a single compartment.

The device comprises a simple and effective means for charging a dishwashing machine with concentrated cleaning material and thereafter supplying concentrated cleaning material to the reservoir of the dishwashing machine in proportion to the amount of rinse water used in the dishwashing machine.

I claim:

1. A solution tank of the character described, comprising a container, an inner compartment within said container having liquid communication with the space outside said compartment, an overflow device in said compartment having its inlet opening spaced upwardly from the bottom of the container above the point at which the inner compartment has liquid communication with the space outside of said compartment, said overflow device discharging exteriorly of the container, a water supply pipe entering said container and said inner compartment, said water supply pipe having an opening therein adapted to discharge water passing through said pipe into said inner compartment, and float control means operated by a predetermined rise of liquid within the inner compartment and the space outside said compartment of said container to direct water from the opening in said pipe into said overflow device.

2. A solution tank of the character described, comprising a container, a division wall interiorly dividing said container into two compartments, one of said compartments being adapted to contain a quantity of soluble cleaning material and said overflow means havnig its inlet disposed the passage of liquid from one compartment to the other compartment, comparatively large overflow means within the compartment opposed to the soluble material containing compartment, said overflow means having its inlet disposed above the openings in the division wall and discharging exteriorly of the container, a pipe passing through a wall of said container into the interior thereof and adapted to be connected at its opposite end to the rinse water spray line of a dishwashing machine, said line having a small opening therein positioned interiorly of said container to discharge a quantity of water from said rinse line into the soluble material containing compartment of the container.

3. A solution tank of the character described, comprising a container, a division wall therein dividing said container into two compartments, said division wall having openings therein near the bottom of the container for the passage of liquid from one compartment to the other, one of said compartments being adapted to contain a quantity of soluble cleaning material, comparatively large overflow means within the compartment opposed to the soluble cleaning material containing compartment, said overflow means having its inlet disposed above the openings in the division wall and discharging exteriorly of the container, a pipe passing through a wall of said container into the interior thereof and adapted to be connected at its outer end to the rinse water spray line of a dishwashing machine, said line having a metered opening positioned interiorly of said container to discharge a predetermined quantity of water from the rinse line into the container.

4. A solution tank of the character described, comprising a container, an upstanding wall therein dividing the container into two compartments, one of said compartments being adapted to contain a quantity of soluble cleaning material, an overflow pipe mounted in the other compartment and discharging below the bottom of said compartment and having an inlet opening therein spaced above the bottom of said compartment, said upstanding wall having openings therein for the passage of liquid between said compartments, a valve mounted in said container near the bottom thereof and manually operable to discharge the liquid contents of said container, a pipe extending through the wall of the container into the interior thereof and having a small orifice therein interiorly of said container discharging into the compartment containing the cleaning material, the end of said pipe extending into the compartment opposed to the compartment containing the cleaning material and having openings therein discharging water passing through said pipe into said compartment, float control means operated by a predetermined rise of liquid in said container to direct water passing through said last mentioned openings into said overflow pipe, the outer end of said pipe being adapted to be connected to the rinse water line of a dishwashing machine.

5. In combination with the rinse line of a dishwashing machine, a solution tank for dissolving and feeding solution to the dishwashing machine, said tank comprising a container, a vertically disposed division wall therein interiorly dividing said container into a cleaning material storage compartment, and a solution storage compartment, said division wall being formed with openings connecting the lower portions of said compartments, an overflow passage for feeding solution to the dishwashing machine leading from said solution storage compartment from a point above the openings in said division wall, a pipe leading from the rinse water spray line into said container, said pipe having an outlet into the cleaning material storage compartment of the container whereby the operation of the rinse line will bypass a predetermined quantity of water from the rinse line into said cleaning material storage compartment at each operation of the rinse line.

6. A solution tank of the character described, comprising a container embodying side, top and bottom walls, a division wall extending upwardly from the bottom wall of the container dividing the same into two compartments, one of which comprises a soluble cleaning material storage compartment and the other of which comprises a solution storage compartment of substantial size, said division wall being formed with openings adjacent its bottom edge, said openings comprising a communication between the compartments, said wall being imperforate above said openings, a water supply inlet means opening into the upper end of the soluble cleaning material storage compartment and comprising means for supplying water intermittently thereto, and an overflow passage leading from said solution storage compartment from a point above the openings in the division wall but below the top of said division wall, said overflow opening discharging through an exterior wall of said container.

7. In combination with a rinse line having a rinse control valve of a dishwashing machine, a solution tank including a compartment for holding a quantity of soluble cleaning material and an adjacent solution holding compartment, the dividing wall between said compartments being formed with a connecting passage and being imperforate above said passage to maintain a uniform level in the two compartments, said solution compartment being formed with an overflow discharge passage at a point above the connecting passage in the dividing wall to the dishwashing machine, and bypass means leading from that side of the rinse line which constitutes the discharge side with respect to the rinse control valve to the soluble material holding compartment of said tank and adapted to discharge a portion of the water passing through said rinse line into said soluble material holding compartment at each operation of the rinse line, for the purpose set forth.

8. A solution tank comprising a container having a vertical partition therein dividing said container into a cleaning material storage compartment and a solution storage compartment, said compartments being in communication only through the lower end of said partition, means for supplying water intermittently to said first compartment, screen means positioned in the material storage compartment above the point of communication between said two compartments, said screen means constituting a perforated division wall permitting the passage of the solution therethrough from the cleaning material storage compartment to the solution storage compartment and overflow means for said solution storage compartment having its inlet positioned at some distance above the communication between said compartments but below the top of said partition.

9. In combination with the rinse line of a dishwashing machine, said machine including a receptacle for holding articles to be washed; a solution tank for holding a quantity of soluble cleaning material, a rinse control valve for said rinse line, a separate pipe branching from said rinse line on the discharge side of said valve and leading to said solution tank, said pipe being adapted to discharge a portion of the water passing through said rinse line onto said soluble cleaning material in said tank at each operation of said rinse line, means on said pipe for controlling the amount of water discharged therefrom onto said soluble cleaning material at each operation of said rinse line, and a conduit separate from said rinse line and connecting said tank to said receptacle.

10. The structure of claim 9, and said controlling means on said pipe comprising a metering plug.

THOMAS D. LANE.

CERTIFICATE OF CORRECTION.

Reissue No. 20,262. February 9, 1937.

THOMAS D. LANE.

It is hereby certified that error appears in the printed specification of the above numbered patent requiring correction as follows: Page 3, first column, line 71, claim 2, for "overflow means havnig its inlet disposed" read division wall having openings therein for; and that the said Letters Patent should be read with this correction therein that the same may conform to the record of the case in the Patent Office.

Signed and sealed this 20th day of September, A. D. 1938.

Henry Van Arsdale (Seal) Acting Commissioner of Patents.